United States Patent
Tracy et al.

(10) Patent No.: US 10,134,206 B2
(45) Date of Patent: Nov. 20, 2018

(54) METHOD AND APPARATUS FOR VIDEO COMPOSITION, SYNCHRONIZATION, AND CONTROL

(71) Applicant: FORD GLOBAL TECHNOLOGIES, LLC, Dearborn, MI (US)

(72) Inventors: Jonathan Tracy, Ann Arbor, MI (US); John Michael Fischer, Brighton, MI (US); David Schwanky, Brighton, MI (US); Harold Bernard Samuels, Farmington, MI (US); Fengming Yang, Ann Arbor, MI (US); Waleed Johnson, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/496,770

(22) Filed: Apr. 25, 2017

(65) Prior Publication Data

US 2018/0308301 A1 Oct. 25, 2018

(51) Int. Cl.
*H04N 5/765* (2006.01)
*G07C 5/08* (2006.01)
*G07C 5/00* (2006.01)
*G07C 5/02* (2006.01)

(52) U.S. Cl.
CPC ........... *G07C 5/0866* (2013.01); *G07C 5/008* (2013.01); *G07C 5/02* (2013.01); *G07C 5/085* (2013.01)

(58) Field of Classification Search
CPC ........ G07C 5/0866; G07C 5/008; G07C 5/02; G07C 5/085

USPC .......................................................... 386/200
See application file for complete search history.

(56) References Cited

U.S. PATENT DOCUMENTS

| 2010/0077441 | A1* | 3/2010 | Thomas | G06F 3/1415 725/133 |
| 2012/0140074 | A1* | 6/2012 | Taguchi | B60R 1/06 348/148 |
| 2013/0070082 | A1* | 3/2013 | Chen | H04N 21/41422 348/118 |
| 2015/0057779 | A1* | 2/2015 | Saungsomboon | G06F 3/16 700/94 |
| 2016/0143022 | A1* | 5/2016 | Kim | H04W 76/10 455/415 |
| 2016/0182701 | A1* | 6/2016 | Kang | H04M 1/6091 455/445 |
| 2016/0379422 | A1 | 12/2016 | Kahn | |

FOREIGN PATENT DOCUMENTS

CN 102957884 A 3/2013

* cited by examiner

*Primary Examiner* — Thai Tran
*Assistant Examiner* — Jose Mesa
(74) *Attorney, Agent, or Firm* — Jennifer Stec; Brooks Kushman P.C.

(57) ABSTRACT

A system includes a smart-phone processor configured to receive a video recording feed from a camera. The processor is also configured to receive a vehicle data feed from a vehicle connected to the processor. The processor is further configured to convert the vehicle data feed into images. The processor is additionally configured to add the images to the video recording feed in real-time and save a combined feed including the video and images resulting from the adding.

16 Claims, 4 Drawing Sheets

METHOD AND APPARATUS FOR VIDEO COMPOSITION, SYNCHRONIZATION, AND CONTROL

TECHNICAL FIELD

The illustrative embodiments generally relate to methods and apparatuses for video composition, synchronization, and control.

BACKGROUND

Many vehicle owners enjoy racing around tracks or over roads in their vehicles. The experience of zooming along in a performance vehicle is an exciting one, and the owners love to achieve new feats, test their skills and tell their friends about their accomplishments. Of course, a picture is worth a thousand words, and these owners may install specialized cameras to take video feeds and snapshots of their activities as they travel.

While a live video or photo is a good start, the owner may want to know how fast they were going at a particular time. Other owners may want to review the videos to improve their personal driving performance, and in those instances data about engine speeds, braking, turning, engaged traction controls, etc. might be useful. To obtain all of this data, the owner would have to record all of the data from either a dashboard or directly from a vehicle data bus, and then the owner would have to review the two data sets (video and live data) in concert to attempt to find a correlation between certain vehicle characteristics and visual performance data.

SUMMARY

In a first illustrative embodiment, a system includes a smart-phone processor configured to receive a video recording feed from a camera. The processor is also configured to receive a vehicle data feed from a vehicle connected to the processor. The processor is further configured to convert the vehicle data feed into images. The processor is additionally configured to add the images to the video recording feed in real-time and save a combined feed including the video and images resulting from the adding.

In a second illustrative embodiment, a computer-implemented method includes receiving a live camera feed. The method also includes receiving a vehicle data feed. The method further includes converting the vehicle data feed into images representative of the vehicle data. Also, the method includes combining the live camera feed and images in real-time and saving a combined feed including the combined live camera feed and images.

In a third illustrative embodiment, a computer-implemented method includes establishing a monotonic timer. The method further includes receiving a video feed comprising vehicle data overlaid on live video including monotonic timestamps. The method also includes replaying a recently traveled route from a top-down perspective in a first window. Further, the method includes replaying the video feed in a second window and switching a view between the first and second windows based on user selection, wherein a monotonic timestamp representing a percentage of monotonic time elapsed in the video feed is used as a reference to synchronize the route replay at a corresponding percentage completed.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
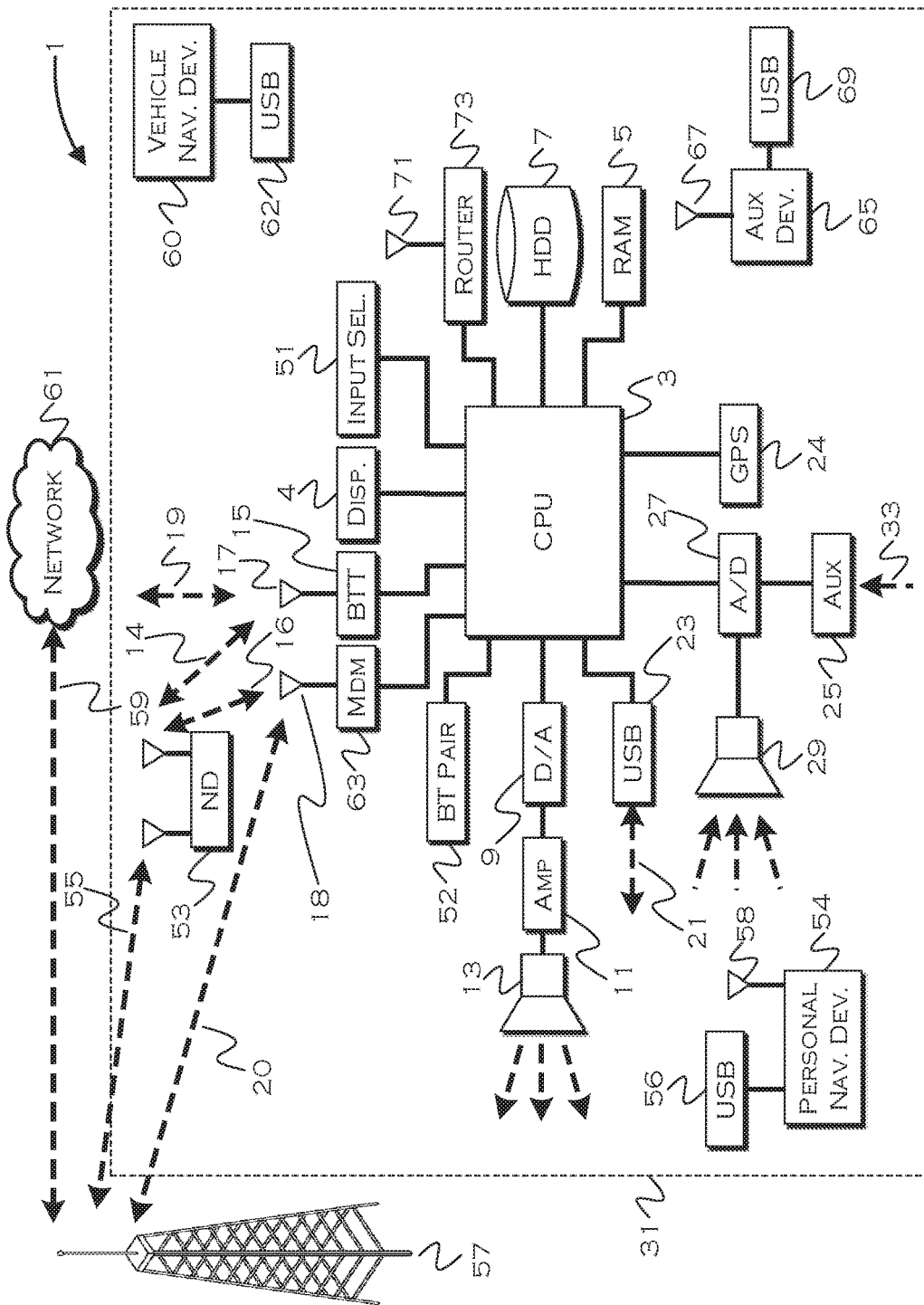
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments are presented with respect to aspects of a mobile and/or vehicular application that allows a user to record, track and view various aspects of a vehicle race. The race could be run on a street or track, the application allows the user to track and record race-related data regardless of the environment in which the user is operating.

While the illustrative processes are described with respect to such an application, they may also have general vehicular applicability and are not always confined to applicability in a race-related setting. For example, without limitation, vehicle data, timing data, route data, track data and other recorded and playback-able data could all be recorded and viewed relating generally to any route or path, and this data could also be used to support other illustrative functionality, such as navigation improvements.

The illustrative embodiments relate to race data recorded via a vehicle-mounted camera. In the examples, the camera is included as part of a user smart-device. The user affixes the camera to a mount and orients the camera so that the camera records a vehicle/driver viewpoint. The phone, in the examples, is connected to the vehicle via a wire, although a wireless connection is also possible if sufficient bandwidth to handle the data is available.

While the race is running, the smartphone records the visual race data as seen by the device camera. At the same time, the vehicle sends live CAN bus data to the smartphone. The phone converts the data into meaningful images, and adds the converted data to a displayed/recorded view in real-time. This helps synch the data to the video feed, as opposed to post-recording processing, which may have difficulty lining up data exactly between recorded vehicle data and the video data. While the smartphone converts and records the CAN data in this example, the phone could also stream the video data to the vehicle and the vehicle could convert and add the CAN data on the vehicle side in real time, if that alternative were preferred.

Figure 2:
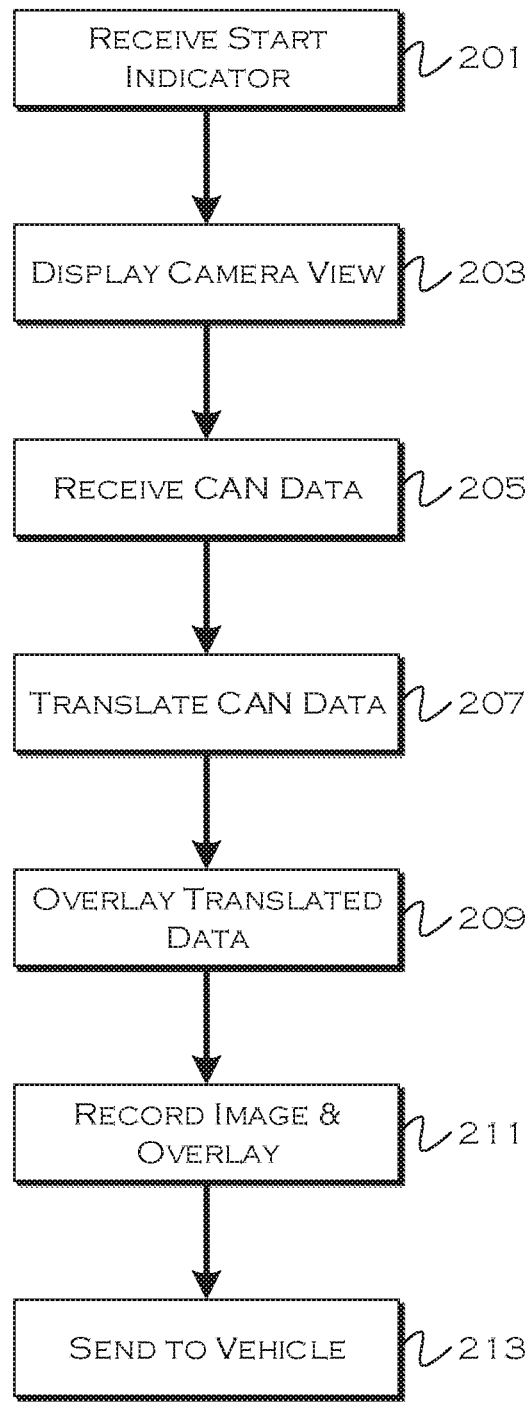
FIG. 2 shows an illustrative process for race and data aggregation.

FIG. 2 shows an illustrative process for race and data aggregation. In this illustrative example, a race recording process executing on a smartphone, including a camera, receives 201 an indicator that a race is starting. This could include, but is not limited to, a user pushing a start button, certain vehicle movement, any vehicle movement, a vehicle passing a defined start position, etc.

Once the camera is mounted and engaged, a vehicle data or the phone screen displays 203 the viewpoint of the camera (which is part of the phone). In another example, a vehicle camera may be fed into the phone and that camera data could be used instead. While the phone is running and gathering the camera data, the phone is also receiving 205 vehicle CAN bus data. The vehicle knows, or is told by the phone, which CAN data is appropriate for transmission to the phone. This data can include, but is not limited to, speedometer data, tachometer data, control settings, timing data and any other data that is considered to be race-relevant. In one example, the user can configure a selectable data set to include whatever data is of interest to the user.

The phone also converts 207 the CAN data to a meaningful image. This could be simple text data, or could include a visual representation of a tachometer or speedometer. Any other suitable representation of the data in a meaningful form could also be used, and users could even load custom "skins" that presented the data in a user-configured manner. The process then overlays 209 the converted data onto the incoming video stream, so that the CAN data and video data are merged in real-time.

The phone records 211 the merged data as a single file, which can be played back with well-synched CAN and visual data, providing an effective real-time view of any point in a race with corresponding vehicle system data. The process also sends 215 the data to the vehicle, where the data can be saved, reviewed and otherwise manipulated via a vehicle display.

Figure 3:
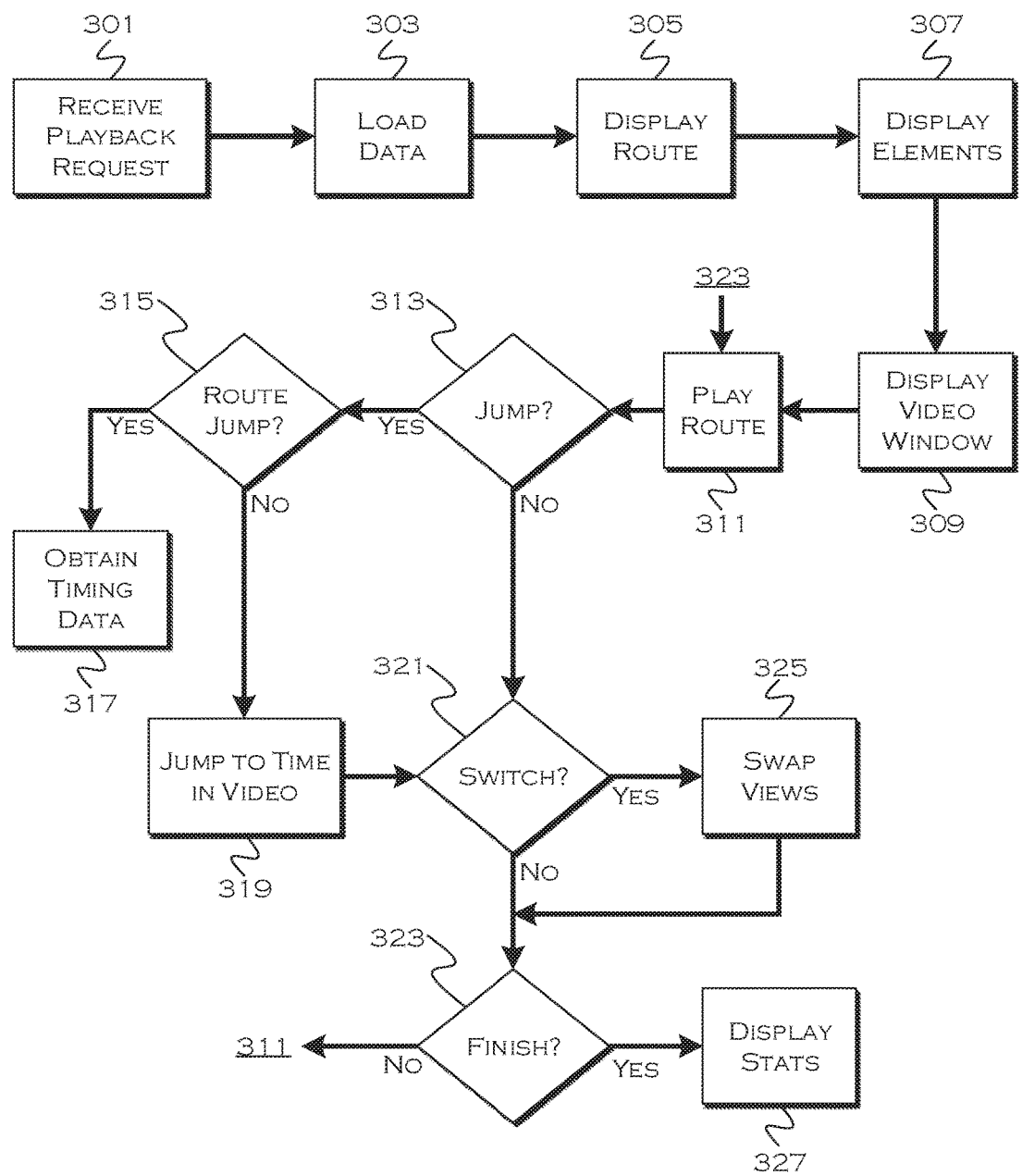
FIG. 3 shows an illustrative process for race playback.

FIG. 3 shows an illustrative process for race playback. In this example, the data has already been recorded by a processor and camera combination, which could include a smartphone in conjunction with a vehicle BUS. The phone passes the data to a vehicle computer, where the computer stores the data and makes the data available for playback using a vehicle display. The data, which was also recorded by the phone, could also be played on the phone instead of the vehicle.

The process receives 301 a request for data playback, which could be a selection from a selectable list of files, or could be a request relating to data that had just completed recording. The process loads 303 the requested data from local or remote device memory. The playback process displays a multi-window display, which in this example includes a larger main window and a smaller sub-window. One window shows the route/track traveled, which can include a top-down view and, if a street-track, the data can be overlaid onto a map. The second window displays the view recorded by the camera, along with the now-embedded data.

In this example, the display begins with a route 305 display and included elements 307, which can include artificially inserted elements such as vehicle representations, start and finish representations, ghost cars (showing better/worse/last/competitor timing) and any other suitable elements (checkpoints, etc.). The display also includes 309 the second window with the video feed. In this example, all of this data is disabled during driving, although the relevant data could all be displayed live during a route/race if desired.

The process also plays 311 the route and video in conjunction. When playing the route, the process could draw a bright line as the route progresses with time, move a vehicle representation along the route, or any other suitable method of representing the vehicle position on a route representation. The video feed also shows the real-time view of what the camera saw at any route position and the converted vehicle-data that was included real-time with the video feed.

The user also has the option to "jump" 313 to any position in the displayed data. This could be done, for example, by selecting a point on the route, moving a timing slider or using any other suitable control (fast forward, etc). Another possible user control includes a switch 315 function, which allows the user to swap the larger and smaller display windows, to better view the desired output. Until the race finishes 323, the process will continue playback and provide the user with the described functional control. Typical video control (pause, play, rewind, etc) may also be possible and usable with regards to either window. Both windows operate in synchronization, as described herein, so modification of the race-timing point in either window results in the display of the corresponding appropriate data in the other window.

If the user elects to jump 313 to a different position in the playing data (or paused data), the process determines 315 if the jump is on a video slider (timer) or using a selected point on a route. If the jump is at a route-point, the process obtains 317 timing data related to the vehicle position at the selected point on the route. This data could be derived from, for example, a monotonic timer associated with both the route-playback window and the video-playback window. The process can then use 319 the timing data to jump to the appropriate point in the video feed as well. If the alternative (selection of time in the video feed) jump is made, the process can use the timing data to determine the appropriate vehicle position associated with the route display.

If the user elects the switch 321 functionality, the process can swap the views 325 between the two displayed windows. Again, a single timer correlated to both displayed data sets can be used, so that when playback resumes following the swap, both data sets remain synchronized. When the race/route finishes 323, the process can display 327 a set of statistics for the race, which can include, for example, current time, best time, etc.

Figure 4:
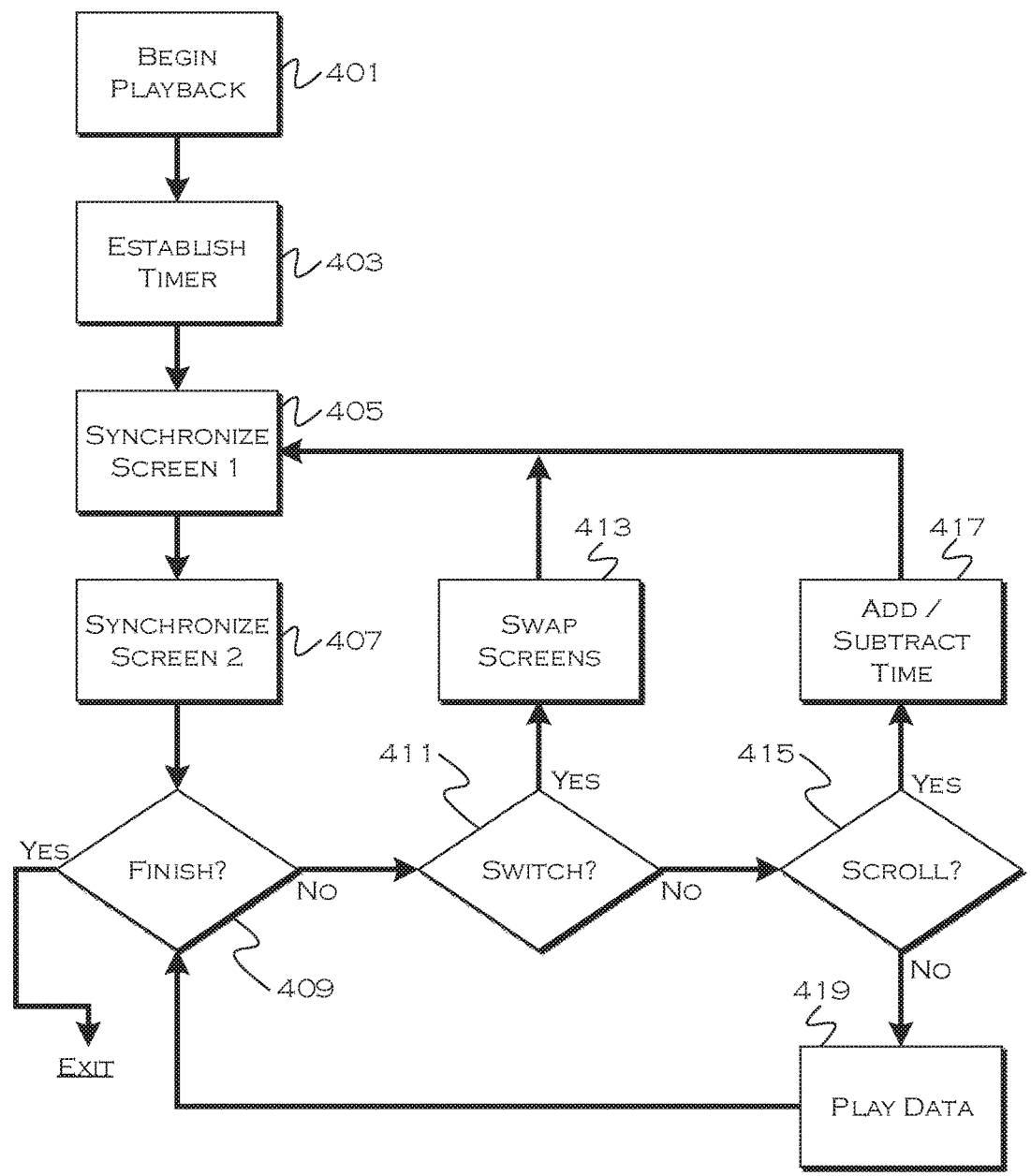
FIG. 4 shows an illustrative process for playback synchronization.

FIG. 4 shows an illustrative process for playback synchronization. In this example, when playback begins 401, the process establishes 403 a monotonic timer, or clock synchronizer, which is independent of a device timer. This timer is used in correlation to both displayed windows, so that movement (in time) in either window is accurately reflected in the other window. The timer is used to control and synchronize the timescales of video playback, vehicle timestamp references for vehicle data, and real time. Jumping forward and backwards in time moves both data sets forward and backward the same amount, and both data feeds are played and timed with respect to the monotonic timer so that the displayed information remains in synchronization.

Vehicle data time may be a timestamp that counts up monotonically (at a certain frequency not dependent on other data) and may be used as a master control to seek through playback. When playing back, a vehicle timestamp references a current monotonic time to find elapsed time as a percentage to drive a seek bar. When a user seeks, the percentage of the seek-bar drives a reverse conversion back to a current monotonic time.

Once the process establishes the timer, the process synchronizes 405 screen 1 and synchronizes 407 screen 2 to the timer. The data playback is based on the monotonic timer value, as noted, and movement within one data set moves the timer forward an equal amount with respect to the other data set, keeping the views in synch. Until the race finishes 409, the process continues to control both displays according to the monotonic timer.

If the user elects to switch 411 the display at any point to swap the windows, the process swaps 413 the screens. This may result in a delay or hangup of the playback of either data set, so the process again synchronizes both screen to the single timer. If the timer itself experiences a delay or hang, this will be identically reflected in both screens, so the user synchronization experience should not be impacted.

If the user scrolls or jumps 415 forward or backward in time, with regards to either display, the process can add or subtract 417 the appropriate amount of time to the timer based on relative movement forward or backward selected by the user. By adjusting the timer, since both displays are controlled based on the timer value, the process ensures that the timing between displays remains synchronized, regardless of which window is used for a jump or which type of jump in time is made. The process continues to play 419 the data, in the absence of a switch or jump, until the race/route finishes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a smart-phone processor configured to:
receive a camera-generated video recording feed;
receive a vehicle data feed from a processor-connected vehicle;
convert the vehicle data feed into images;
add the images to the video recording feed in real-time;
synchronize the video feed and the converted vehicle data feed images based on a monotonic timer as a reference for both feeds; and
save a combined feed including the video with images from the adding.

2. The system of claim 1, wherein the camera is included in the smart-phone.

3. The system of claim 1, wherein the camera is included in the vehicle.

4. The system of claim 1, wherein the vehicle is wirelessly connected to the smart-phone.

5. The system of claim 1, wherein the vehicle is wiredly connected to the smart-phone.

6. The system of claim 1, wherein the images replicate a dashboard display.

7. The system of claim 1, wherein the images include text representative of data feed data.

8. The system of claim 7, wherein the text includes engine speed.

9. The system of claim 7, wherein the text includes vehicle speed.

10. The system of claim 7, wherein the text includes running time.

11. The system of claim 7, wherein the text includes acceleration.

12. The system of claim 1, wherein the processor is configured to send the saved combined feed to the vehicle.

13. The system of claim 1, wherein the processor is configured to display the combined feed on a smart phone display.

14. A computer-implemented method comprising:
establishing a monotonic timer;
receiving a video feed comprising vehicle data overlaid on live video including monotonic timestamps;
replaying a recently traveled route from a top-down perspective in a first window;
replaying the video feed in a second window; and
switching a view between the first and second windows based on user selection, wherein a monotonic timestamp representing a percentage of monotonic time elapsed in the video feed is used as a reference to synchronize the route replay at a corresponding percentage completed.

15. The method of claim 14, wherein a user can selectively move forward or backward in the route replay and the method includes using a completed time percentage portion of the route starting at a selected forward or backward selection as a percentage of elapsed monotonic time to replay the video feed starting at a timestamp corresponding to the percentage of elapsed monotonic time.

16. The method of claim 14, wherein a user can selectively move forward or backward in the video feed and the method includes using a percentage of elapsed monotonic time, as indicated by a timestamp, at a selected forward or backward selection, as a percentage of elapsed route replay time to replay the route starting at a percentage of route travel time corresponding to the percentage of elapsed monotonic time.

* * * * *